Figure 1:
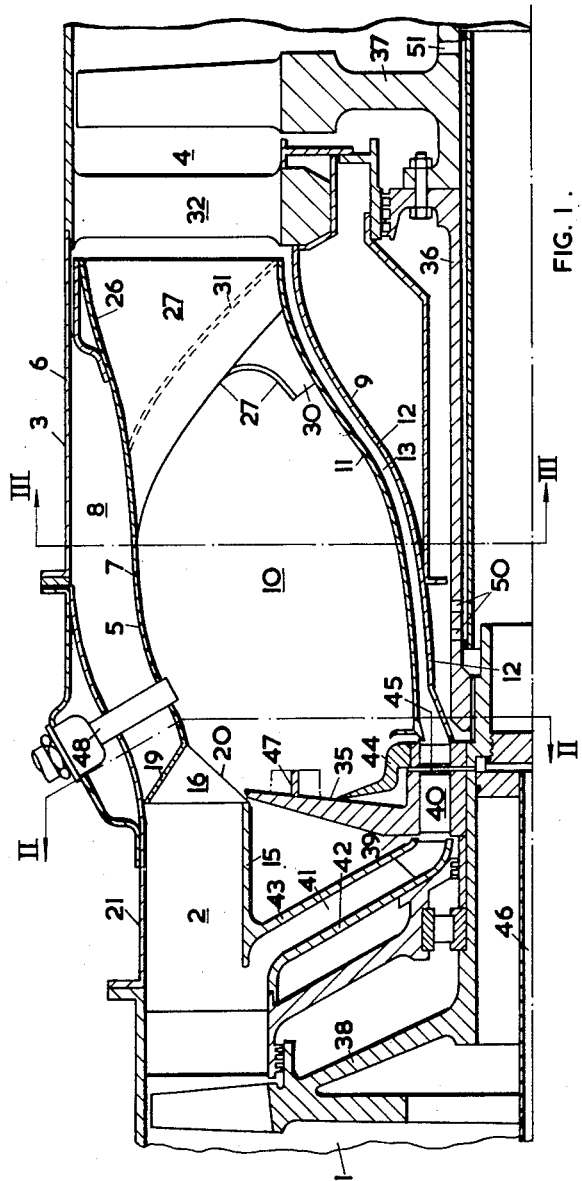

Feb. 13, 1962 W. DEACON ETAL 3,020,718
COMBUSTION CHAMBER FOR A GAS TURBINE POWER PLANT PROVIDED WITH
A ROTATING FUEL ATOMIZER AND A FLAME STABILIZING
INLET STRUCTURE
Filed July 20, 1959 6 Sheets-Sheet 1

William Deacon
Glyn T. Golesworthy
Edward L. Hartley
Peter Martin
Inventors

By
Stevens, Davis, Miller & Mosher
Attorneys

Feb. 13, 1962 W. DEACON ETAL 3,020,718
COMBUSTION CHAMBER FOR A GAS TURBINE POWER PLANT PROVIDED WITH
A ROTATING FUEL ATOMIZER AND A FLAME STABILIZING
INLET STRUCTURE
Filed July 20, 1959 6 Sheets-Sheet 3

William Deacon
Glyn T. Golesworthy
Edward L. Hartley
Peter Martin
Inventors

By
Stevens, Davis, Miller & Mosher
Attorneys

United States Patent Office 3,020,718
Patented Feb. 13, 1962

3,020,718
COMBUSTION CHAMBER FOR A GAS TURBINE POWER PLANT PROVIDED WITH A ROTATING FUEL ATOMIZER AND A FLAME STABILIZING INLET STRUCTURE
William Deacon, Church Crookham, Glyn Trevor Golesworthy, Barton-on-Sea, Edward Langford Hartley, Farnborough, and Peter Martin, Farnham, England, assignors to Power Jets (Research & Development) Limited, London, England, a British company
Filed July 20, 1959, Ser. No. 828,085
Claims priority, application Great Britain July 31, 1958
9 Claims. (Cl. 60—39.74)

This invention relates to gas turbine plant and in particular to combustion systems of such plant. In conventional plant of this kind fuel is continuously supplied into a combustion chamber to which is fed a supply of compressed air and the effluent, after combustion of the fuel, is expanded through a gas turbine. Various means have been proposed for supplying the fuel into the combustion chamber. One of these comprises a fuel distributing member, e.g. a disc, rotatably mounted in the chamber, means for rotating this member and means for introducing fuel on to the surface of the member so that, on rotation thereof, fuel is thrown off the member as a sheet of fuel. The fuel sheet so produced is atomised by a high velocity air stream as it leaves the member. This arrangement forms the subject of copending United States patent application Serial No. 647,918, filed March 22, 1957, in the names of Probert et al.

Such an arrangement has advantages in continuous combustion plant, in particular gas turbine plant, in that it allows the normal diffuser section of the combustion chamber to be omitted. This results in the possibility of reducing the overall axial length of the combustion system and allows of a high degree of heat release from the combustion of fuel in a relatively small combustion space.

The use of a high velocity air stream to break up a sheet of fuel presents combustion problems such as non-uniform combustion of fuel and the present invention aims to provide an improved combustion system operating in this manner.

According to the invention there is provided combustion apparatus comprising a combustion space with an annular air inlet thereto at one end and a fuel distributing member coaxially mounted within the inlet, liquid fuel being introduced onto this member which is rotatable about its axis so that the fuel is discharged therefrom across the inlet. Further, there are provided fingers extending across the inlet, the fingers being circumferentially spaced from one another and being inclined from the radial direction in the direction of rotation of the fuel-distributing member so that they extend in the direction of fuel discharge and define flame stabilizing zones on their downstream sides.

In one form of the invention the fingers are provided by part of a flow-divider structure located near the inlet to the combustion space, the flow divider serving to divide the flow into a number of channels of which some direct air into the combustion space across the path of fuel discharge and others direct air over the outside of the combustion space. The flow divider may comprise, for this purpose, a number of radially spaced partitions extending along the path for air to the inlet and dividing the flow path into a number of radial sections. Fingers are arranged within the channels some to direct air into the combustion space and others to direct air over the outside of the combustion space. Those fingers which direct air over the outside of the combustion space present faces to the interior of the flame tube which may serve to provide flame stabilising zones.

Figure 1A:
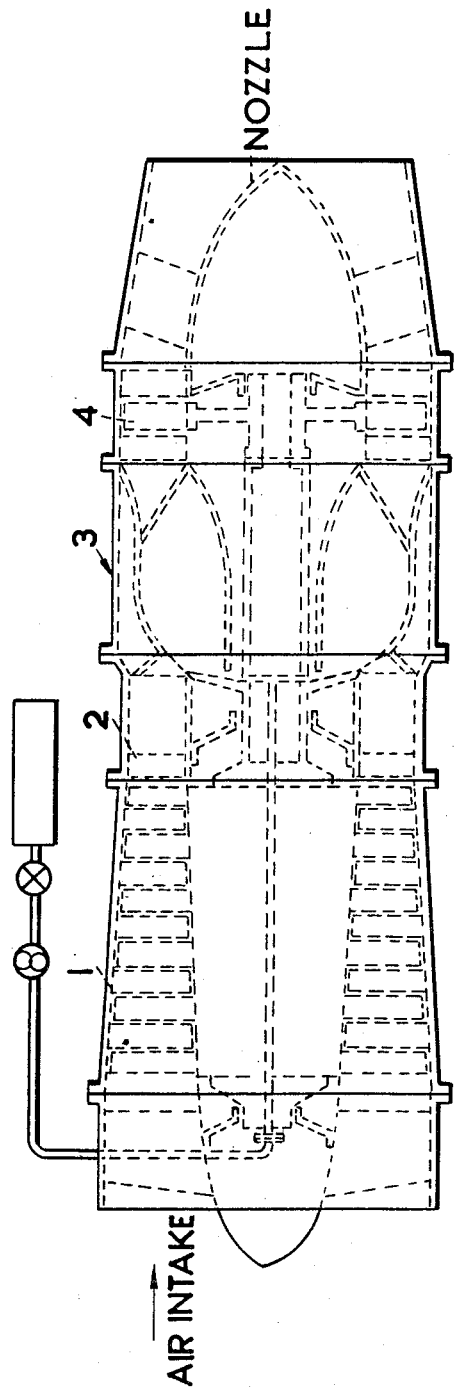
Figure 2:
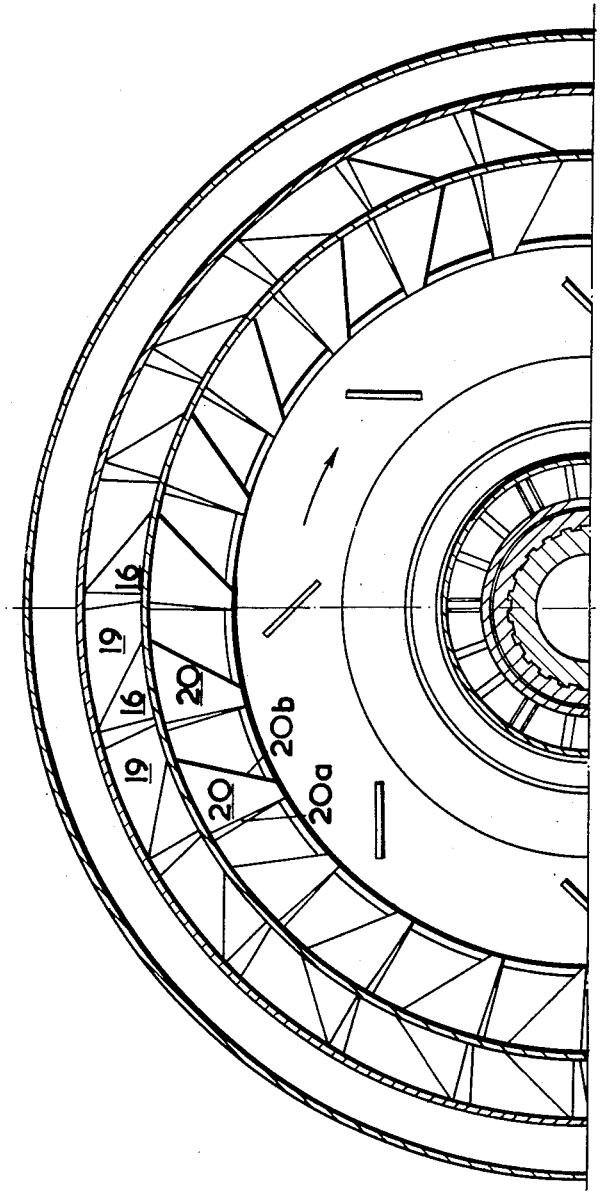
Figure 3:
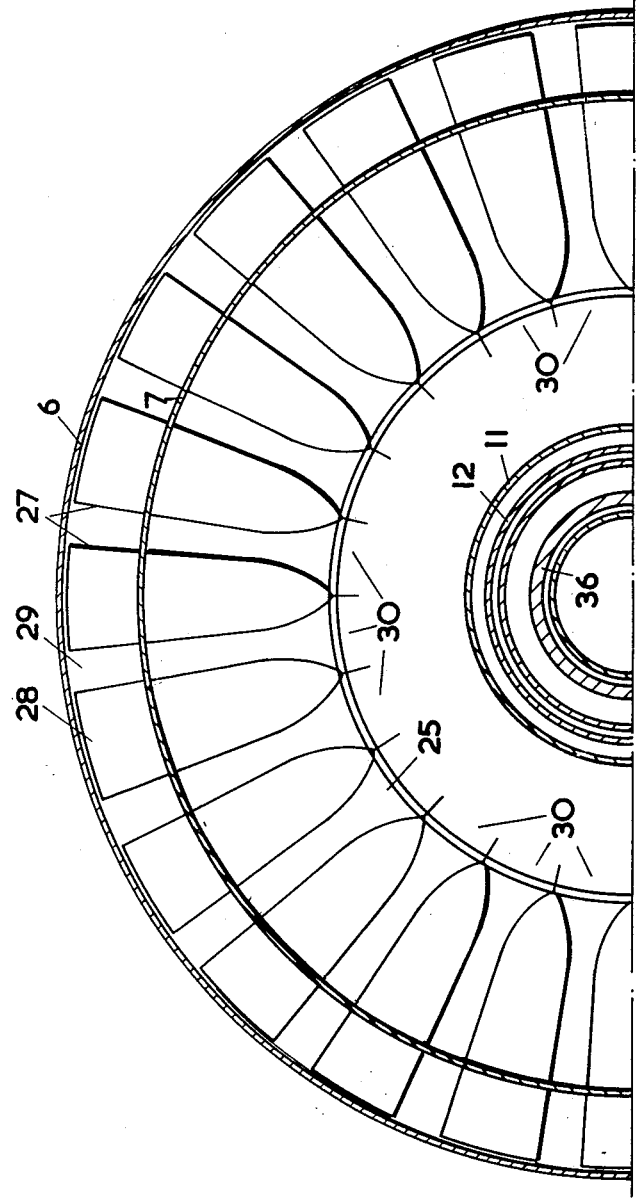
Figure 4:
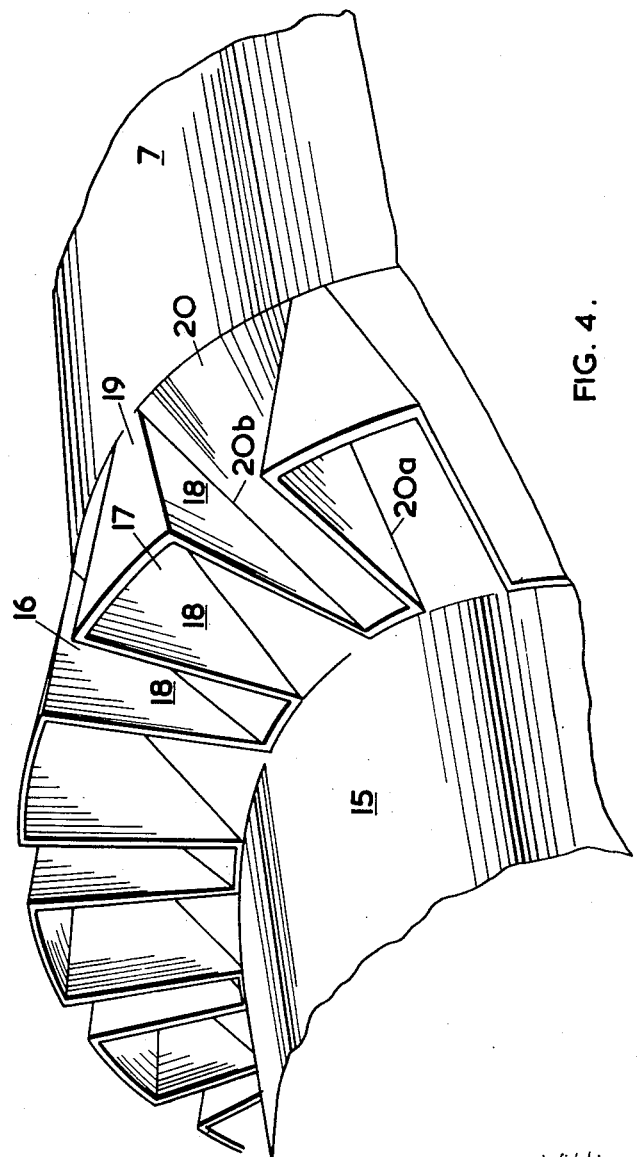
Figure 5:
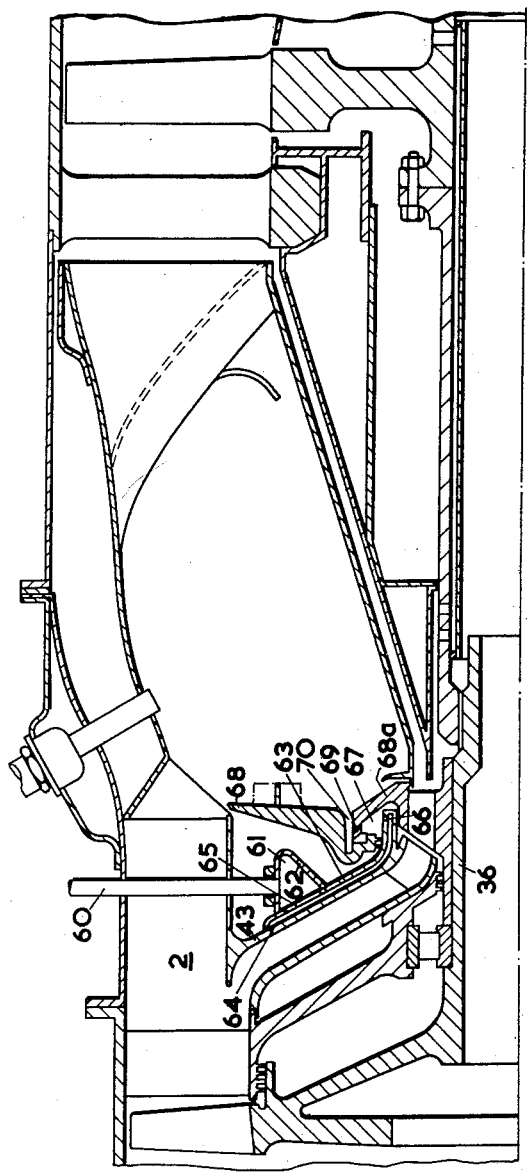

In the accompanying drawings:
FIGURE 1A is an axial section of an aircraft gas turbine jet propulsion plant.
FIGURE 1 is a longitudinal half-sectional view of a combustion chamber of a gas turbine plant.
FIGURES 2 and 3 are sections on the lines II—II and III—III respectively of FIGURE 1.
FIGURE 4 is a perspective view of the air inlet to the combustion chamber of FIGURE 1.
FIGURE 5 is a longitudinal half-sectional view of an alternative form of combustion chamber.

Referring firstly to FIGURE 1A the jet propulsion plant comprises an air intake, an axial flow compressor 1 arranged to supply air from the intake through an annular duct 2 to an annular combustion chamber 3 from which the combustion products discharge into an axial flow turbine 4. The effluent from the turbine 4 is discharged through a jet propulsion nozzle to provide a propulsive thrust.

The combustion chamber 3 as shown in more detail in FIGURE 1 is formed by a flame tube 5 and a combustion chamber casing 6, the radially outer wall 7 of the flame tube defining with the casing an annular axially extending passage 8 for the leading of cooling air over the outside of the flame tube. The flame tube has also a radially inner wall 9 forming with the outer wall an annular combustion space 10, the inner wall comprising two skins 11, 12 spaced apart to provide a passage 13 for the flow of cooling air therebetween.

The air inlet to the flame tube is defined between the downstream edge of an inner wall 15 of the duct 2 and the upstream edge of the outer wall 7 of the flame tube, and in order to distribute the air flowing in the duct between the flame tube and the passage 8 surrounding the flame tube a flow divider is mounted at the inlet. The flow divider provides a number of channels of which a first series 17 direct a portion of the air into the passage 8 and a second series 16 direct the remaining air into the flame tube. As can been best from FIGURE 4, these channels are formed by partition walls 18 which span the outlet of the duct 2 in a generally radial direction and fingers 19, 20 which extend from the upstream edge of the outer wall 7 of the flame tube and are inclined alternately outwards to the outer wall 21 (FIGURE 1) of the duct 2 or inwards to the inner wall 15 of the duct 2, each finger being secured along its side edges to the adjacent edges of a pair of the partition walls 18. The leading edge of each of the inwardly inclined fingers 20 is secured to the downstream edge of the duct wall 15 and, as shown in FIGURE 2, one side edge 20a of each of the fingers 20 extends at an angle slightly less than 90° to the leading edge and the opposite edge 20b at an angle substantially less than 90° (for example 60°) to the leading edge, so that the fingers 20 are inclined from the radial direction. The downstream surface of the fingers 20 are thus of oblique sector shape as can be seen in FIGURE 2, the width of the fingers 20 being greater at the wall 7 than at the wall 15. The reason for the asymmetrical form of these fingers will be explained later.

Towards the downstream end of the flame tube, a number of extension pieces 25, 26 extend downstream from the outer wall 7 and are alternately inclined inwards towards the inner wall 9 of the flame tube and outwards to the combustion chamber casing 6. Side walls 27 extending in a generally radial direction between each pair of extension pieces form with these pieces a number of chutes 29, 28, as shown in FIGURE 3, defining alternately interleaved passages for cooling air flowing from the passage 8 and for combustion products flowing from the flame tube. The inner end of each of the inwardly inclined extension pieces 25 is bent in the upstream direction and flared to meet the adjacent extension pieces on either side and form with the inner skin 11 of the flame tube wall 9 a number of upstreamwardly directed outlets 30 which in effect form a single annular outlet for air from the passage 8. A set of inwardly inclined fingers 31 extending through the chutes 29 initially parallel to the extension pieces 25 but terminating at the downstream end of the flame tube wall 9, divide each air chute into two passages, one leading air from the passage 8 through the outlets 30 into the flame tube and the other leading air from the passage 8 into the turbine 4. Each of the air chutes is so arranged with respect to one of the inlet guide vanes 32 of the turbine that the main part of the air is discharged from the chutes on to the convex face of that vane. Preferably the number of air chutes is equal to the number of turbine inlet guide vanes.

The upstream end wall of the flame tube is formed by a fuel distributing disc 35 which is mounted for rotation on the axis of the plant with its periphery lying adjacent to the air inlet to the flame tube. The disc is supported on the shaft 36 which extends along the axis of the plant and is connected at its rearward end to the rotor 37 of the turbine and at its forward end to the rotor 38 of the compressor. The hub 39 of the disc 35 contains axially extending passages or ports 40 which are in alignment on the rearward side with the forward end of the space 13 between the skins 11, 12 of the flame tube inner wall and on the forward side with a duct 41 which branches from the duct 2 and is defined between two part-conical walls 42, 43 which are supported on the inner wall 15 of the duct 2. The hub 39 of the disc also supports a bell-shaped fuel transfer disc 44 which faces the disc 35 and one or more fuel pipes 45 extend across the hub from a main fuel supply pipe 46 which is located along the axis of the plant, the fuel pipes 45 having their outlets adjacent the inner surface of the transfer disc 44.

The fuel transfer disc 44 is separated from the fuel distributing disc 35 by a narrow gap from which fuel may issue over the face of the latter, and in order that the fuel shall adhere to and spread out over the surface of the disc as it rotates, the fuel carrying surface of the disc 35 is slightly inwardly coned, the angle which this surfaces makes with a plane normal to the axis of the disc being not less than 1½° and preferably between 3° and 5°.

In order to increase turbulence in the combustion zone on the downstream side of the disc 35, paddles 47 are mounted on the rearward face of the disc, the paddles projecting axially into the combustion space 10 and being inclined at an angle to a radius of the disc of up to 45° in a sense to direct the gases within the combustion space outwardly over the face of the disc, their radially outer edges being behind their radially inner edges with respect to the direction of rotation of the disc as indicated by the arrow in FIGURE 2.

An igniter 48 extends across the passage 8 and through the outer wall of the flame tube into the combustion space 10.

In order to cool the turbine, a path for cooling air is formed from the outlet of the passages or ports 40 in the hub of the disc 35, between the skin 12 of the flame tube wall 9 and the shaft 36, via inlet apertures 50 into the hollow interior of the shaft and outlet apertures 51 from the shaft into the turbine.

In operation of this embodiment, air compressed in the compressor 1 discharges into the duct 2 from which a portion is bled off through the duct 41 and travels via the passages 40 in the hub of the disc into the passage 13 between the two skins 11, 12 of the flame tube inner wall from which it discharges into the turbine. In traversing the passage 13, the air serves to cool the inner skin 11 which is directly exposed to the heat of combustion within the flame tube and also heat insulates the outer skin 12 and the parts enclosed thereby. The air discharge from the passage 13 assists in cooling the inlet guide vanes 32 of the turbine.

The main part of the air within the duct 2 is divided between the space 8 and the combustion passage 10 in the approximate ratio of 1.5 to 1. In view of the close proximity of the compressor outlet and the combustion chamber inlet, and the fact that little diffusion of the compressed air can take place within the duct, the air entering the flame tube sweeps over the periphery of the disc 35 at high velocity and the presence of the fingers 20 extending across the inlet of the flame tube induces turbulence in this air flow.

To effect a high intensity of combustion within the flame tube, fuel is passed outwardly from the fuel pipe 46 through the pipes 45 on to the fuel transfer disc 44 and thence on to the surface of the disc 35 at such a rate that after spreading outwardly over this surface under centrifugal force it is discharged from the periphery as a sheet of fuel as distinct from a spray. On meeting the high velocity inlet air stream, the fuel sheet is instantly shattered into droplets and the resulting fuel/air mixture is ignited and burns in a violently turbulent toroidal path within the space 10. The effect of the rotation of the paddles 47 is to increase the turbulence by impelling the gases within the flame tube in an outward direction generally tangential to the path of the paddles and the inclination of the fingers 20 described above is intended to produce on the downstream side of the fingers, a flame stabilizing zone lying along the path of motion of the gases leaving these paddles and the direction of discharge of fuel from the disc.

The turbulence of the gases burning in the toroidal path within the flame tube is accentuated by the flow of cooling air entering the flame tube through the outlets 30, which flows initially in an upstream direction over the surface of the inner skin 11 of the flame tube inner wall.

The combustion gases leave the flame tube at a relatively high temperature but in the inlet guide vanes 32 of the turbine these gases mix with the cooling air delivered from the passage 8 through the chutes 29. This cooling air, being directed mainly on to the convex surface of each guide vane, maintains the temperature of these vanes at an acceptable value. The inlet guide vanes 32 are further cooled by air discharged from the passage 13 between the skins 11, 12 and the turbine rotor 37 is cooled by air entering the shaft 36 through the apertures 50 and leaving it through the apertures 51.

FIGURE 5 shows an alternative embodiment of a gas turbine plant in which the cooling system is substantially the same as that shown in FIGURE 1. The fuel inlet system however is modified in that a fuel pipe 60 extends across the duct 2 and discharges into an annular the wall 43 a channel 64 into which fuel is admitted from the gallery 61 through apertures 65 and is discharged through apertures 66 into an annular gallery 67 formed in the hub 68a of the fuel distributing disc 68. Apertures 69 in the hub permit fuel to pass into a trough 70 formed in the rearward surface of the disc from which the fuel gallery 61 enclosed between an annular channel member 62 and a part-conical wall 63. The wall 63 forms with overflows on to this surface to be discharged in the manner described above.

We claim:

1. Combustion apparatus comprising an outer wall externally bounding a combustion space; means defining an annular air inlet to the combustion space at one end thereof; a fuel-distributing member coaxially mounted within said inlet; means for introducing liquid fuel onto said member; means for rotating said member about its axis so that the fuel is discharged therefrom outwardly across said inlet; and fingers extending across said inlet, said fingers being circumferentially spaced from one another and being inclined from the radial direction in the direction of rotation of the fuel-distributing member so that they extend in the direction of fuel discharge and define flame stabilising zones on their downstream sides.

2. Combustion apparatus comprising an outer wall externally bounding a combustion space; means defining an annular air inlet to the combustion space at one end thereof; a fuel-distributing disc coaxially mounted within said inlet, said disc having a side face extending transversely to the direction of flow through said inlet with its periphery adjacent the inner edge of said inlet; means for introducing liquid fuel onto said side face of the disc; means for rotating the disc about its axis so that the fuel is discharged from the periphery of the side face outwardly across said inlet; and fingers extending across said inlet, said fingers being circumferentially spaced from one another and being inclined from the radial direction in the direction of rotation of the disc so that they extend in the direction of fuel discharge and define flame stabilising zones on their downstream sides.

3. Combustion apparatus according to claim 2 wherein the width of the fingers increases radially outwardly.

4. Combustion apparatus according to claim 2 wherein said side face of the disc is the downstream face and constitutes a bounding wall of the combustion space at its inlet end, and further comprising paddles mounted on said face of the disc and projecting into the combustion space, the paddles being inclined to the radial direction so that their radially outer edges are behind their radially inner edges with respect to the direction of rotation of the disc.

5. Combustion apparatus comprising inner and outer coaxial annular walls defining between them an annular passage, the inner wall externally defining a generally axially extending combustion space; a further coaxial wall within said outer wall defining therewith an annular generally axially extending air inlet passage, the downstream edge of said further wall being spaced inwardly from and upstream of the upstream edge of said inner wall to define therewith an annular inlet to the combustion space; a fuel-distributing member coaxially mounted within said inlet; means for introducing liquid fuel onto said member; means for rotating said member about its axis so that the fuel is discharged therefrom across said inlet; and a flow divider adjacent said inlet, said divider comprising a first series of fingers extending across said inlet between the downstream edge of said further wall and the upstream edge of said inner wall and circumferentially spaced apart from one another, a second series of fingers circumferentially alternating with the fingers of the first series and extending outwardly and in an upstream direction from said upstream edge of said inner wall to said outer wall, and walls extending generally radially between adjacent edges of adjacent fingers, said radially extending walls and said fingers defining circumferentially alternating channels for leading air from said inlet passage into the combustion space and into the annular passage between the inner and outer walls, and the fingers of the first series being inclined from the radial direction in the direction of rotation of the fuel-distributing member so that they extend in the direction of fuel discharge and define flame stabilising zones on their downstream sides.

6. Gas turbine plant comprising a compressor including a rotor; a turbine coaxial with and axially spaced from the compressor and including a rotor; an axially extending driving shaft connecting said rotors; an annular combustion system lying between said compressor and turbine, said system including inner and outer annular walls coaxially surrounding said shaft and defining between them a generally axially extending annular combustion space, means defining an annular air inlet from said compressor to said combustion space, and means defining an outlet from said combustion space to said turbine; a fuel-distributing disc mounted on said shaft for rotation therewith coaxially within said inlet, said disc having a side face extending transversely to the direction of flow through said inlet with its periphery adjacent the inner edge of said inlet; means for introducing liquid fuel onto said side face of the disc so that, on rotation of the disc, the fuel is discharged from the periphery of the side face outwardly across said inlet; and fingers extending across said inlet, said fingers being circumferentially spaced from one another and being inclined from the radial direction in the direction of rotation of the disc so that they extend in the direction of fuel discharge and define flame stabilising zones on their downstream sides.

7. Gas turbine plant according to claim 6 wherein the width of the fingers increases radially outwardly.

8. Gas turbine plant according to claim 6 wherein said side face of the disc is the downstream face and constitutes a bounding wall of the combustion space at its compressor end, and further comprising paddles mounted on said face of the disc and projecting into the combustion space, the paddles being inclined to the radial direction so that their radially outer edges are behind their radially inner edges with respect to the direction of rotation of the disc.

9. Gas turbine plant according to claim 6 wherein the combustion system comprises a further coaxial annular wall spaced radially outwardly from said first-mentioned outer wall and defining therewith an annular passage connecting said compressor and said turbine, and said fingers constitute parts of a flow divider which also comprises fingers circumferentially alternating with said first-mentioned fingers and walls extending generally radially between adjacent edges of adjacent fingers, said fingers and walls defining circumferentially alternating channels for leading air into the combustion space and into the annular passage.

References Cited in the file of this patent

UNITED STATES PATENTS

| 2,547,959 | Miller | Apr. 10, 1951 |
| 2,705,401 | Allen et al. | Apr. 5, 1955 |

FOREIGN PATENTS

| 847,530 | Germany | Aug. 25, 1952 |